(No Model.) 2 Sheets—Sheet 2.

I. H. & C. DAHLMAN.
STOCK CAR.

No. 282,706. Patented Aug. 7, 1883.

Witnesses:
J. Staib
Chas. H. Smith

Inventors:
Isaac H. Dahlman
Charles Dahlman
per Lemuel W. Serrell atty

UNITED STATES PATENT OFFICE.

ISAAC H. DAHLMAN AND CHARLES DAHLMAN, OF NEW YORK, N. Y.

STOCK-CAR.

SPECIFICATION forming part of Letters Patent No. 282,706, dated August 7, 1883.

Application filed June 4, 1883. (No model.)

*To all whom it may concern:*

Be it known that we, ISAAC H. DAHLMAN, and CHARLES DAHLMAN, of the city, county, and State of New York, have invented an Improvement in Stock-Cars, of which the following is a specification.

The object of this invention is to increase the facility for introducing horses into the stalls in the car, and for lessening the space occupied by the partitions, and at the same time furnishing a passage-way for an attendant to reach all the animals while the car is in motion. By practical experience we find that it is preferable to have the stalls as narrow as consistent with the usual width of horses or other stock, so that there will be less risk of the animal falling any distance and striking against the partition or side of the stall when the car starts or stops suddenly. In making narrow stalls difficulty has heretofore arisen in opening the partitions sufficiently to allow the animals to be passed in easily in succession, and in feeding and tending them it is generally necessary to open the cars when standing still. I obviate these objections by hinging the doors in the partition so that they open "shingling," and hence a large portion of the width of the car can be opened to admit the animal and the partition closed successively as the stalls are filled. The standing portions of the partitions are placed so as not to interfere with the animal when being introduced into or removed from the car, and a passage-way is left in front of the animals in which a metal trough is placed to form a manger, and also a support for the attendant as he passes along to attend to the animals.

Figure 1:
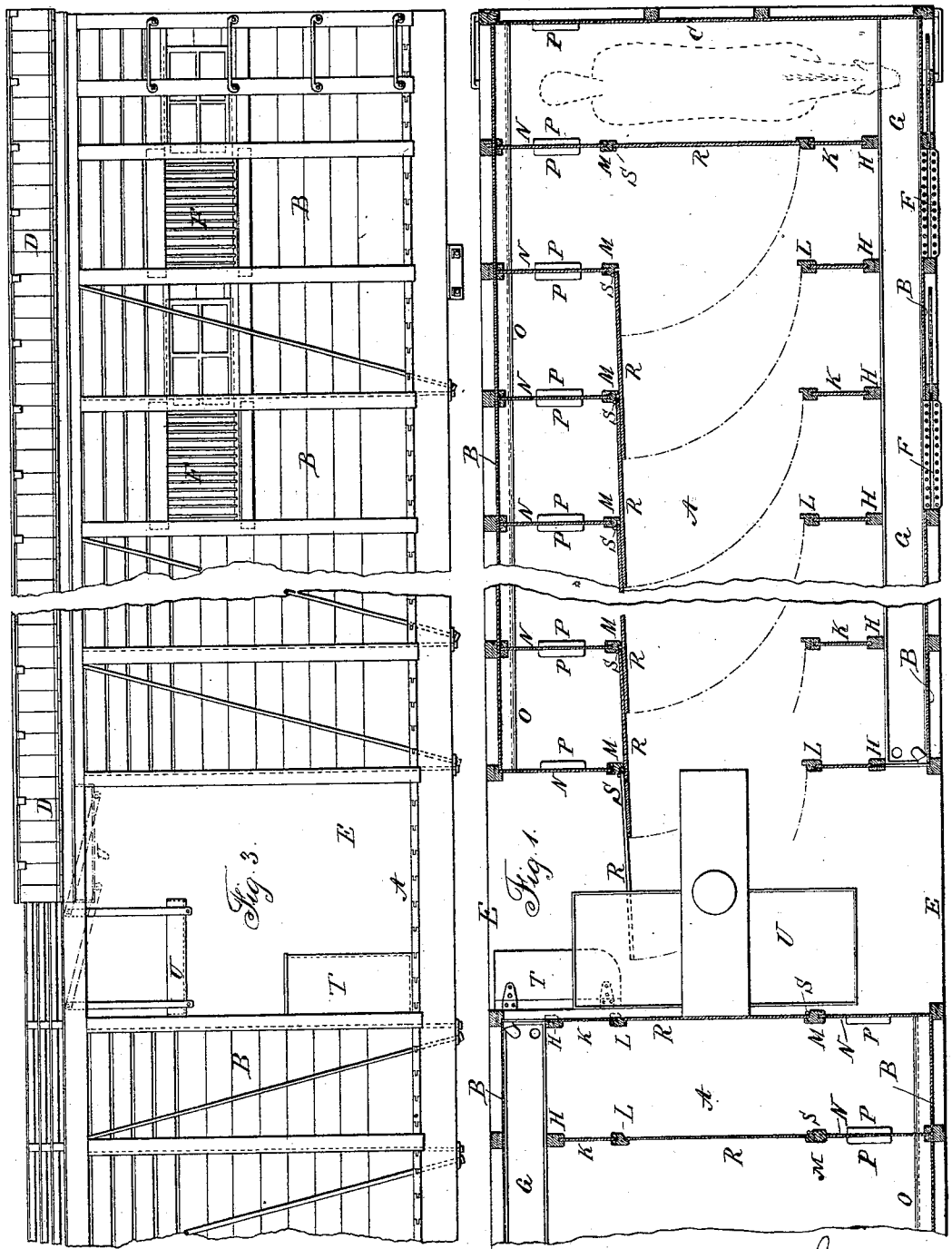
Figure 2:
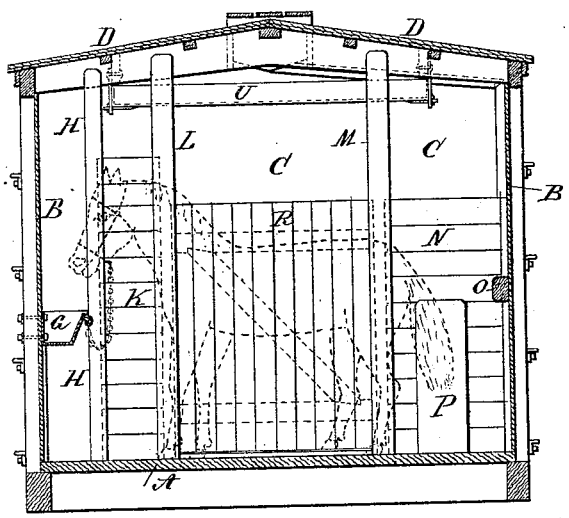

In the drawings, Figure 1 is a sectional plan of the car. Fig. 2 is a cross-section, and Fig. 3 is a partial elevation.

The trucks and the framing of the car may be of any desired character. The floor A, sides B, ends C, and roof D may be made in the usual manner. It is, however, preferable to provide the entrance-doors at the middle, as in freight-cars, as shown at E, and to have gratings in the windows F, and sliding sashes to be opened or closed, according to the weather.

The iron trough G is about a foot wide and firmly secured to the side of the car, preferably about three feet from the floor.

The stanchions H H are placed close against the iron trough and secured to the floor and roof-beams. They should be about two feet nine inches apart and grooved on their edges for the reception of the short partition-boards K, that are introduced between the stanchions H and the door-jamb stanchions L, which are similarly grooved, and also formed with rabbets to receive the doors. At the other side of the car there is another line of door-post stanchions, M, similar to the door-posts L, and the fixed boarding N extends between them and the side of the car.

There is a rump-plank at O, which may be padded, and serves to prevent the animal becoming injured by contact with the side of the car, and at P there are kicking-planks, that protect the partition from the animals' hoofs.

The doors R are hinged at S and swing toward the center of the car and lap one upon the other, as shown. Hence these doors can be as wide as required for convenience in introducing or removing the animals. The doors may be close-battened doors for winter, and open iron-work similar to railing for summer. These doors R, instead of being made as one piece, may, if desired, be made in two or more sections hinged together, and be held by a sliding bar on the top rail. We prefer to make them in two sections.

When the car is to be filled, the doors are all opened and lap upon each other. The animals are led or driven in and the end stall filled, and its door closed and secured by a suitable fastening. Then the next stall is filled and its door closed, and so on in succession until the car is filled. This is done with ease and very rapidly, and the discharge of the horses takes place in the reverse order. When on the road the attendant can pass along from the middle to the end of the car, over the iron trough, and he can feed or attend to the animals or supply water to them. The condition of the animals can also be observed from the middle of the car, over the doors, because these doors do not require to come higher than the backs of the animals. The partition K is extended as high as the animals' heads to prevent them reaching each other.

A water-tank may be provided at any suitable part of the car, and it is best to introduce a feed-box, as at T, and to provide a bunk at V, hung from the ceiling, and which can be moved up out of the way. By this means the attendant is provided for and can care for all the animals in the car independently of external supplies, and can keep the horses in a proper condition, so that their value will not be lessened at market by any abrasions of the skin or neglect of feeding.

We claim as our invention—

1. The combination, in a stock-car, of a trough passing along the side of the car, partitions K N, extending transversely of the car and leaving a doorway and a passage-way along in front of the animals and above the trough, and doors hinged at their vertical edges to the partitions N, and lapping on each other when open, substantially as set forth.

2. The combination, in a stock-car, of transverse partitions composed of end stationary portions, K and N, intermediate doors, lapping upon each other when open, a rump-plank, and kicking-planks, substantially as set forth.

3. The combination, in a stock-car, of a longitudinal trough against the side of the car, the stationary partitions K and N, the swinging doors lapping on each other when open, the rump-plank, and the kicking-planks, substantially as set forth.

Signed by us this 31st day of May, A. D. 1883.

ISAAC H. DAHLMAN.
CHARLES DAHLMAN.

Witnesses:
GEO. T. PINCKNEY,
WILLIAM G. MOTT.